(12) United States Patent
Lee (10) Patent No.: US 11,746,580 B2
(45) Date of Patent: Sep. 5, 2023

(54) MULTI-LINK HINGE

(71) Applicant: POONG WON INDUSTRY CO., LTD, Gimhae-si (KR)

(72) Inventor: June Young Lee, Busan (KR)

(73) Assignee: POONG WON INDUSTRY CO., LTD

(*) Notice: Subject to any disclaimer, the term of this patent is extended or adjusted under 35 U.S.C. 154(b) by 153 days.

(21) Appl. No.: 17/401,581

(22) Filed: Aug. 13, 2021

(65) Prior Publication Data
US 2021/0372178 A1 Dec. 2, 2021

Related U.S. Application Data

(63) Continuation of application No. PCT/KR2020/013626, filed on Oct. 7, 2020.

(30) Foreign Application Priority Data

Jan. 2, 2020 (KR) .................. 10-2020-0000155

(51) Int. Cl.
*E05D 3/06* (2006.01)
*E05D 3/16* (2006.01)
(Continued)

(52) U.S. Cl.
CPC .............. *E05D 3/16* (2013.01); *E05D 3/18* (2013.01); *E05D 11/1028* (2013.01); *E05D 2003/163* (2013.01); *E05Y 2900/20* (2013.01)

(58) Field of Classification Search
CPC ... E05F 1/08; E05F 1/10; E05F 1/1041; E05F 1/1091; E05F 1/12; E05F 1/1223; E05F 1/1246; E05F 1/1253; E05F 1/1261; E05F 1/1292; E05F 1/14; E05F 3/20; E05F 3/18; E05D 11/1021; E05D 3/12; E05D 3/14; E05D 3/16; E05D 3/18; E05D 11/10; E05D 11/1028; E05D 15/40; E05D 15/401;
(Continued)

(56) References Cited

U.S. PATENT DOCUMENTS

| 9,759,430 B2 * | 9/2017 | Jadhav | F24C 15/023 |
| 2007/0124893 A1 * | 6/2007 | Brustle | E05F 5/02 |
| | | | 16/296 |

(Continued)

FOREIGN PATENT DOCUMENTS

| CN | 110284785 A | 9/2019 | |
| DE | 102004019785 A1 * | 11/2005 | E05D 15/46 |

(Continued)

OTHER PUBLICATIONS

Korean Notice of Allowance (KR 10-2020-0000155), KIPO, dated Oct. 6, 2020.
(Continued)

*Primary Examiner* — Chuck Y Mah
(74) *Attorney, Agent, or Firm* — Park & Associates IP Law Office (57) ABSTRACT

A multi-link hinge is proposed. The multi-link hinge is configured to facilitate closing and opening of a door, is capable of sufficiently securing a maximum opening angle of the door while decreasing a gap between the door and a main body, and is also capable of providing convenience to a user when the user opens and closes the door.

6 Claims, 6 Drawing Sheets

(51) Int. Cl.
E05D 3/18 (2006.01)
E05D 11/10 (2006.01)

(58) Field of Classification Search
CPC ..... E05D 15/405; E05D 15/406; E05D 15/42;
E05D 15/58; E05D 15/565; E05D
2003/163; E06B 3/5045; E05Y 2800/22;
E05Y 2900/20; E05Y 2900/202; E05Y
2900/208; E05Y 2900/21; E05Y 2201/21;
E05Y 2201/264; E05Y 2201/212; E05Y
2201/604
See application file for complete search history.

(56) References Cited

U.S. PATENT DOCUMENTS

| | | | |
|---|---|---|---|
| 2007/0209654 A1 | 9/2007 | Wang | |
| 2008/0276425 A1* | 11/2008 | Gherardi | E05F 1/1276 16/386 |
| 2010/0109497 A1* | 5/2010 | Blersch | E05D 15/408 312/405 |
| 2010/0162847 A1* | 7/2010 | Gassner | E05F 1/1058 74/490.07 |
| 2012/0084944 A1* | 4/2012 | Hirtsiefer | E05F 1/1058 16/349 |
| 2013/0031746 A1* | 2/2013 | Hasegawa | E05D 15/46 16/50 |
| 2019/0242167 A1* | 8/2019 | Salice | E05F 1/1058 |
| 2019/0316394 A1* | 10/2019 | Kruedener | E05D 7/123 |
| 2021/0189780 A1* | 6/2021 | Nordieker | E05F 11/54 |
| 2021/0372187 A1* | 12/2021 | Lee | E05F 3/20 |
| 2021/0404230 A1* | 12/2021 | Giovannetti | E05F 5/027 |

FOREIGN PATENT DOCUMENTS

| | | | | |
|---|---|---|---|---|
| DE | 102006007702 A1 | * | 8/2007 | ............. E05D 15/46 |
| EP | 3199732 A1 | | 8/2017 | |
| JP | 2010-261279 A | | 11/2010 | |
| KR | 10-2003-0061971 A | | 7/2003 | |
| KR | 20-0444701 B1 | | 6/2009 | |
| KR | 10-1958292 B1 | | 3/2019 | |
| KR | 10-1971950 B1 | | 4/2019 | |
| KR | 10-2021985 B1 | | 9/2019 | |

OTHER PUBLICATIONS

International Search Report (PCT/KR2020/013626), WIPO, dated Jan. 13, 2021.
Extended European Search Report (EP 20909954.8), EPO, dated Apr. 5, 2022.

* cited by examiner

MULTI-LINK HINGE

REFERENCE TO RELATED APPLICATIONS

This is a continuation of International Patent Application to PCT/KR2020/013626 filed on Oct. 7, 2020, which designates the United States and claims priority of Korean Patent Application No. 10-2020-0000155 filed on Jan. 2, 2020, the entire contents of which are incorporated herein by reference.

FIELD OF THE INVENTION

The present disclosure relates to a multi-link hinge capable of facilitating opening and closing of a door of an apparatus such as home appliances and furniture.

BACKGROUND OF THE INVENTION

In general, an apparatus such as home appliances and furniture having a door has a door hinge-connected to a main body thereof to open and close the door. The main body thereof may be opened and closed as the door is rotated.

Recently, an apparatus such as a toaster or a storage box for jewelry is released as a product that is both practical and beautiful in design.

Specifically, the apparatus may minimize inflow of foreign substances from the outside thereof, as a gap between the door and the main body is smaller in a door closed state. Moreover, the apparatus may improve the product completion in design.

Normally, the door is opened by rotation, and in the case, as an edge of the door is moved toward the main body during the rotation, interference between the door and the main body is caused. Therefore, when the gap between the door and the main body is formed smaller, there is a problem that the maximum opening angle of the door may not be sufficiently secured.

Therefore, a need for a hinge capable of reducing the gap between the door and the main body and facilitating door opening and closing motions is growing.

In addition, a demand for a hinge technique capable of providing various convenience to a user when the user opens and closes the door, and of maintaining a door closed state during a door closed state, and of detecting the door full-open state when the door is opened is increasing.

SUMMARY OF THE INVENTION

Accordingly, the present disclosure has been made keeping in mind the above problems occurring in the related art, and an objective of the present disclosure is to provide a multi-link hinge capable of reducing a gap between a door and a main body and of sufficiently securing the maximum opening angle of the door.

Another objective of the present disclosure is intended to provide a multi-link hinge capable of providing convenience to a user in door opening and closing.

In addition, other objectives and advantages of the present disclosure will be described below, and it may be encompassed in a broader scope by means and combinations within the scope that be easily derived from, as well as the disclosure of the matters and embodiments thereof described in the claims of the present disclosure.

In order to accomplish the above objective, the present disclosure provides a cam coupled to a main body of an apparatus having a door to be rotatable on a shaft; an arm link provided at the door; an outer link having a first side portion rotatably coupled to the cam and a second side portion rotatably coupled to the arm link; an inner link provided at a lower portion of the outer link and having a first side portion rotatably coupled to the main body and a second side portion rotatably coupled to the arm link; a connection link having a first side portion rotatably coupled to the cam and a second side portion rotatably coupled to the inner link, and configured to transmit a force rotating the inner link in a direction opposite to a rotating direction of the cam; and an elastic member provided at a lower portion of the cam, and having a first side portion rotatably coupled to the main body and a second side portion rotatably coupled to the cam, and configured to provide a pushing force toward the cam so as to rotate the cam clockwise in response to a door opening motion and to rotate the cam counterclockwise in response to a door closing motion.

The multi-link hinge may include: a tray driving part configured to operate a tray, which is configured to slide into and out of the main body, in conjunction with the door motions.

A cam profile may be formed on an outer circumferential surface of the cam, and a tray driving cam profile defined as a portion between a portion coupled to the outer link and a portion coupled to the elastic member may include a concave portion and a convex portion.

The tray driving part may include: a connector having a first side portion rotatably coupled to the main body and a second side portion coupled to the tray; a cam link having a first side portion coupled to the connector and a second side portion connected to the cam to be rollably moved along the tray driving cam profile; and a tray spring having a first side portion coupled to the connector and a second side portion coupled to the main body, and configured to provide a force pulling the connector toward the cam.

The elastic member may include a main spring, a spring guide inserted in the main spring, and a spring cover coupled to the spring guide.

The multi-link hinge may include: a damper provided at one side of the elastic member, wherein the damper may be configured to be brought into contact with the convex portion of the tray driving cam profile when the cam is rotated counterclockwise due to the door closing motion so that the damper may prevent the door from being suddenly closed.

The convex portion of the tray driving cam profile may include a recessed portion, and the second side portion of the cam link in a rollably moved state may be seated on the recessed portion to detect that the door is in a full open state.

As described above, according to the present disclosure, following effects can be expected.

Due to the multi-link hinge of the present disclosure, a gap between the door and the main body can be reduced and the maximum opening angle of the door can be sufficiently secured. Therefore, inflow of various foreign substances into the main body can be minimized and the product completion in design can be improved.

In addition, door closing can be easily performed and a shock absorbing function can be realized when the door is closed, and door opening can be easily performed and the user can recognize a full-open state of the door, so that convenience can be promoted in door opening and closing.

Moreover, the present disclosure can allow the tray sliding into and out of the main body to be operated in conjunction with the motion of the door, and convenience can be provided to the user and can contribute product quality enhancement.

In addition, other effects of the present disclosure can be broader by not only the embodiments described above and disclosure in the claims of the present disclosure, but also by effects that can occur within the scope that can be easily followed from the embodiments and the claims and by possibilities of potential advantages contributing to industrial development.

DETAILED DESCRIPTION OF THE INVENTION

Hereinbelow, preferred embodiments of the present disclosure will be described in detail with reference to accompanying drawings.

Figure 1:
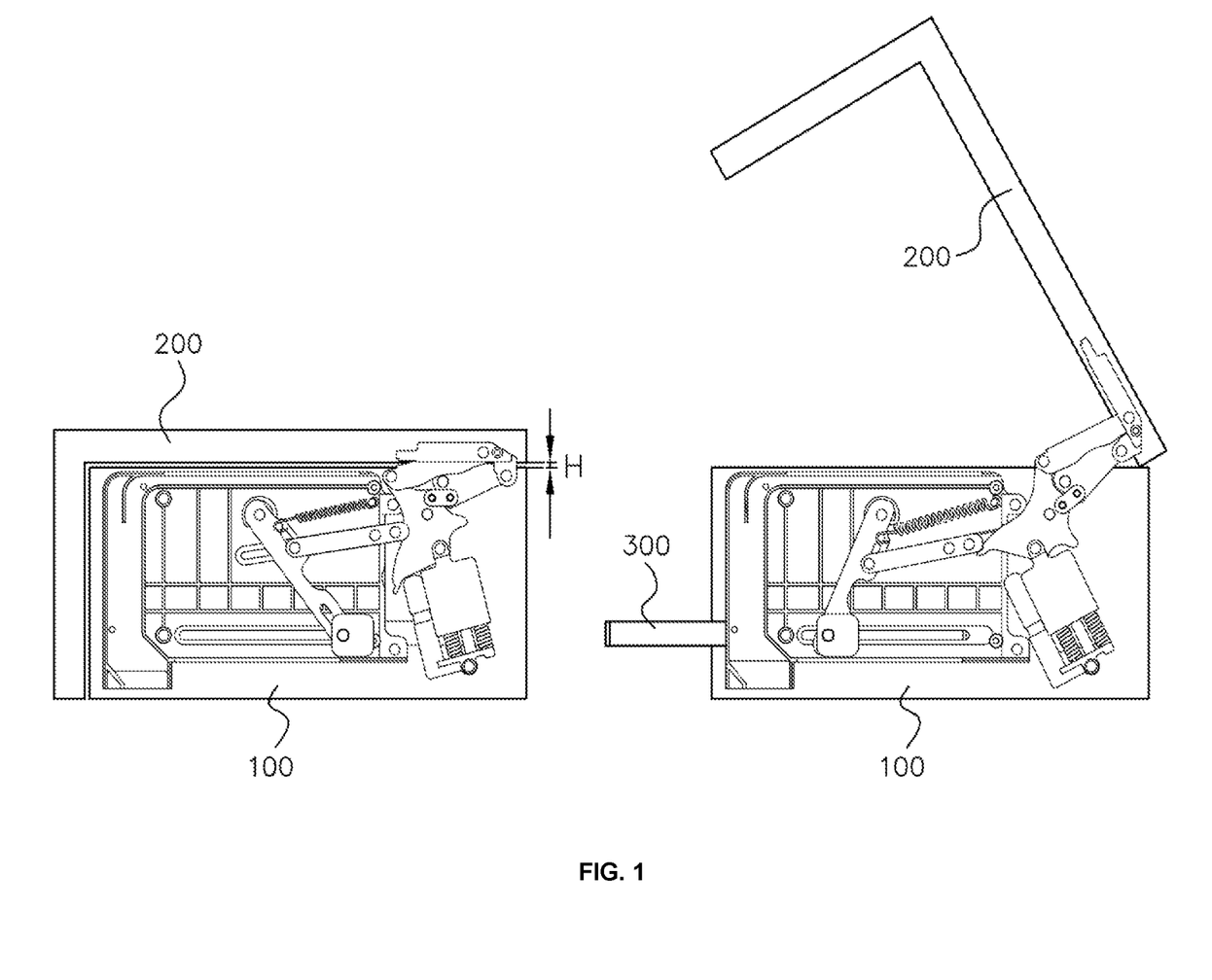
FIG. 1 is a view showing a closed state and an open state of a door of an apparatus to which a multi-link hinge according to the present disclosure is applied.

FIG. 1 is a view showing a closed state and an open state of a door of an apparatus to which a multi-link hinge according to the present disclosure is applied.

As shown in the drawings, an apparatus such as home appliances and furniture having a door includes a main body 100 and a door 200 hinge-connected to the main body 100 to open and close the main body 100. The main body 100 may be opened and closed, as the door 200 is rotated.

The multi-link hinge according to the present disclosure refers to anything connecting the main body 100 to the door 200. In addition, the multi-link hinge may include anything driving the tray 300 sliding into and out of the main body 100 in conjunction with closing and opening motions of the door 200 which will be described below.

As shown in the drawings, the present disclosure is intended to provide the multi-link hinge minimizing a gap H between the main body 100 and the door 200 and facilitating the opening and closing motions of the door. Hereinbelow, the present disclosure will be described in detail with reference to FIGS. 2 to 4.

Figure 2:
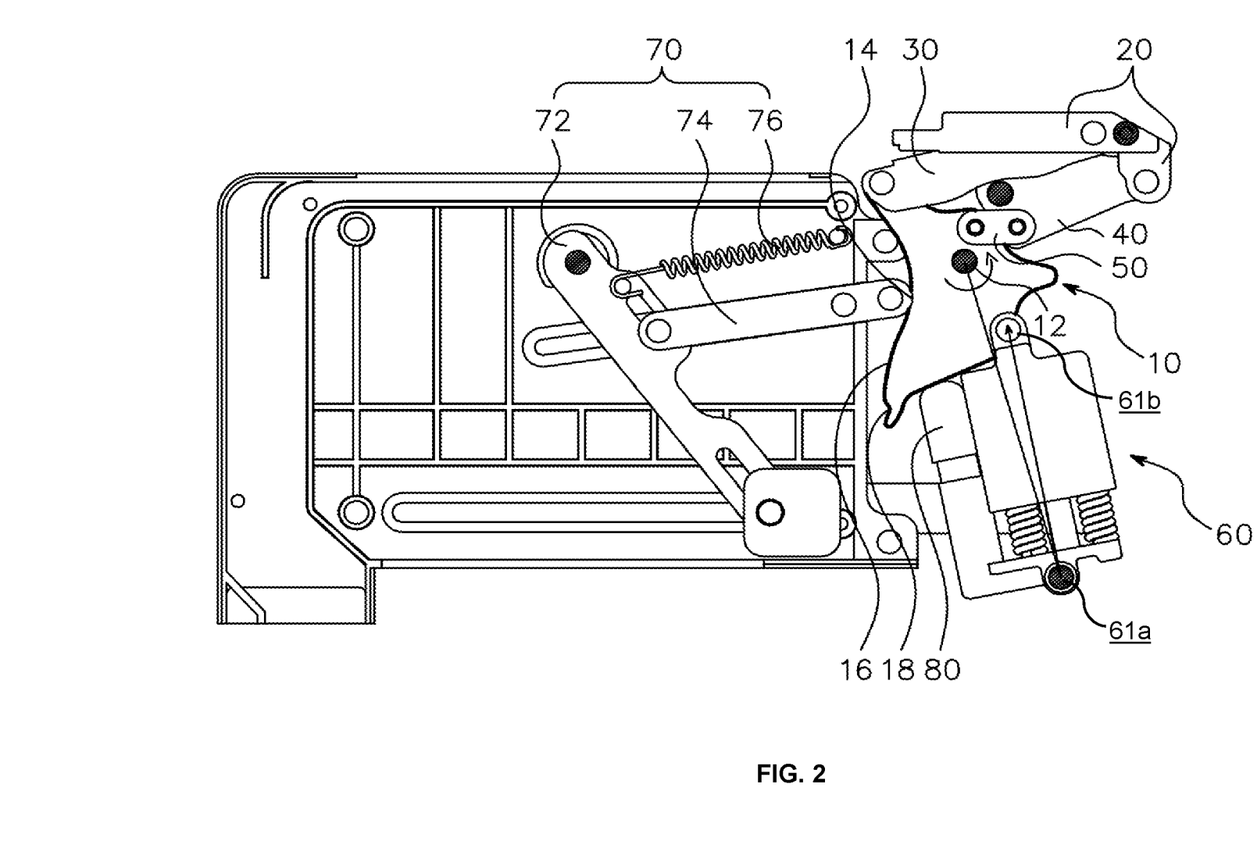
FIGS. 2 to 4 are views stepwisely showing an opening motion of the multi-link hinge according to the present disclosure in the closed state.
Figure 3:
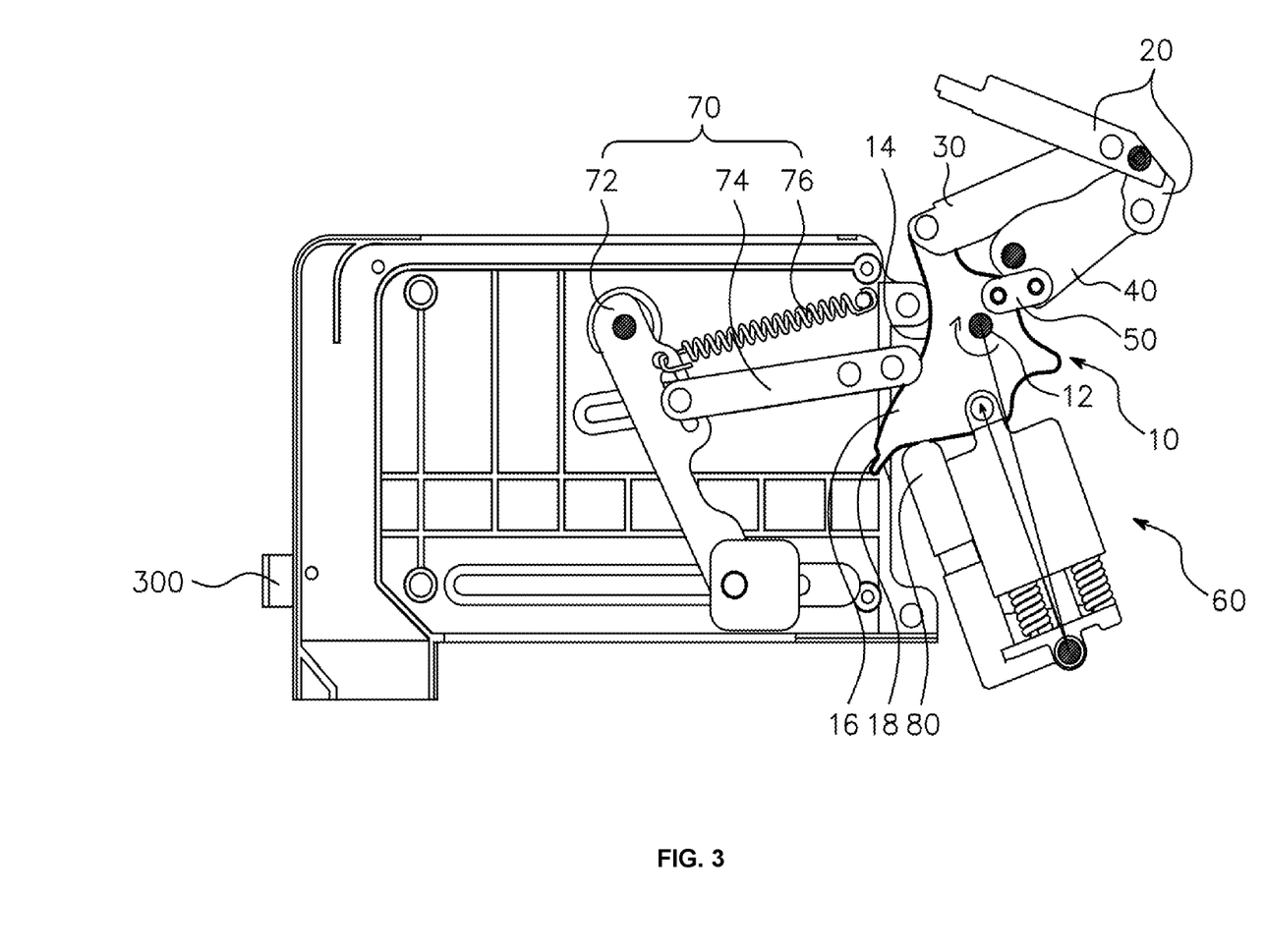
Figure 4:
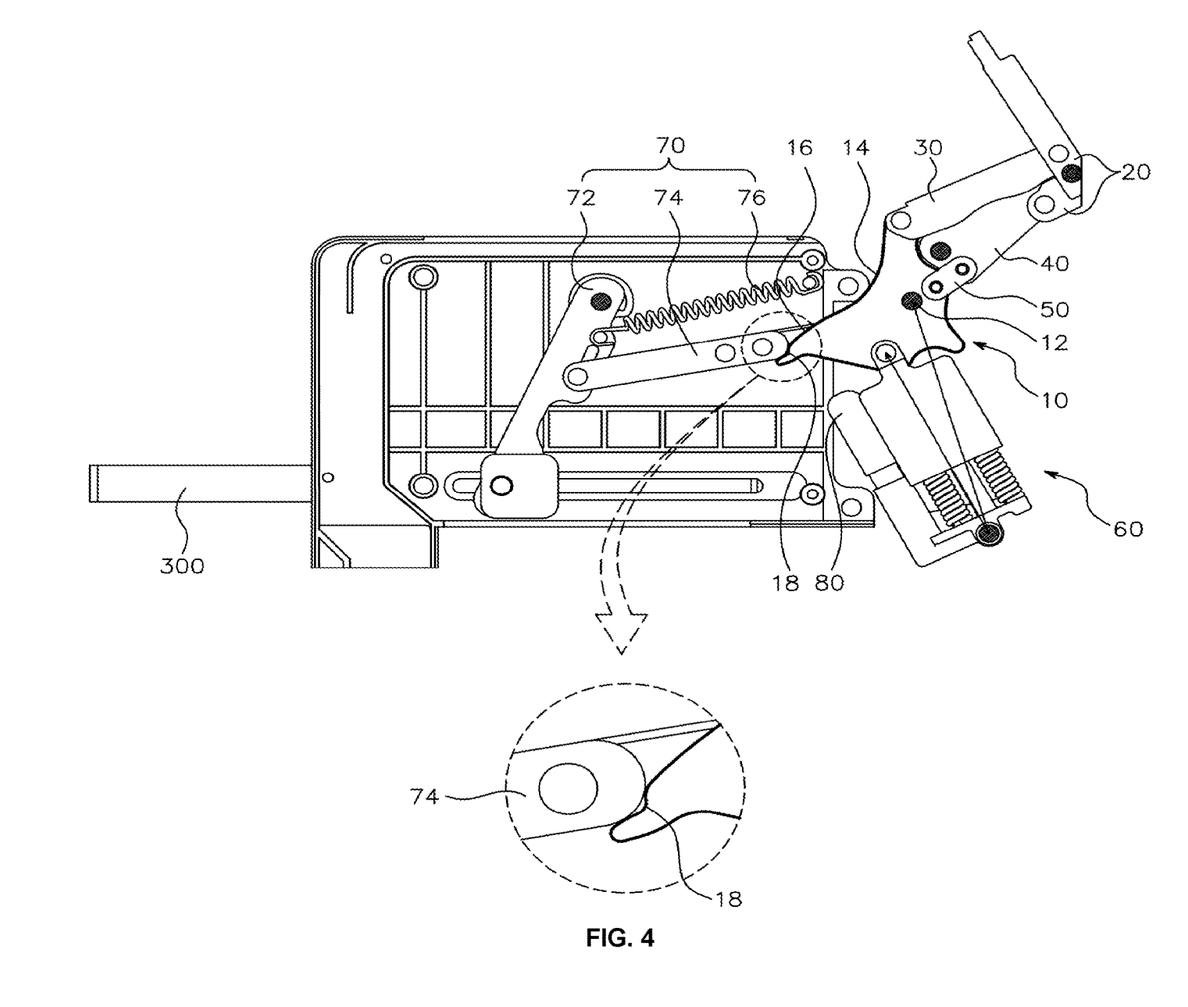

FIGS. 2 to 4 are views stepwisely showing the opening motion of the multi-link hinge according to the present disclosure in the closed state.

FIGS. 2 to 4 are views showing an operational process of the multi-link hinge according to the present disclosure without the door or a main body casing, so a coupling state of entire components such as the door, the main body casing, etc. may be understood with reference to FIG. 1.

The multi-link hinge according to the present disclosure includes: a cam 10, an arm link 20, an outer link 30, an inner link 40, a connection link 50, and an elastic member 60.

The cam 10 is rotatably coupled to the main body of the apparatus on a shaft 12, and a cam profile may be formed on an outer circumferential surface thereof.

The arm link 20 is formed such that relatively long and short members are coupled to each other in a L-shape, as shown in the drawing. Preferably, the long member is coupled to the door. Therefore, a motion of the arm link 20 leads a motion of the door.

The outer link 30 has a first side portion rotatably coupled to the cam 10 and a second side portion rotatably coupled to the arm link 20, i.e. rotatably coupled to the long member of the arm link 20.

The inner link 40 is provided at the lower side of the outer link 30. The inner link 40 has a first side portion rotatably coupled to the main body and a second side portion rotatably coupled to the arm link 20, more preferably, rotatably coupled to the short member of the arm link 20.

The cam 10 and the inner link 40 are coupled to each other via the separate connection link 50. As shown in the drawing, the connection link 50 has a first side portion rotatably coupled to the cam 10 and a second side portion rotatably coupled to the inner link 40.

The cam 10 is rotated on the shaft 12 and the inner link 40 is rotated on the first side portion of the inner link 40 as described below. The connection link 50 transmits a force rotating the inner link 40 in a direction opposite to a rotating direction of the cam 10.

The elastic member 60 is provided at the lower side of the cam 10 to elastically support the cam 10.

The elastic member 60 has a first side portion rotatably coupled to the main body with an elastic member pivot shaft 61a affixed to the main body and a second side portion rotatably coupled to the cam 10 with an elastic member connection shaft 61b affixed to the main body to transmit a pushing force toward the cam 10. In detail, the elastic member 60 serves to rotate the cam 10 clockwise on the shaft 12 in response to the opening motion of the door, and rotates the cam 10 counterclockwise on the shaft 12 in response to the closing motion of the door.

Figure 5:
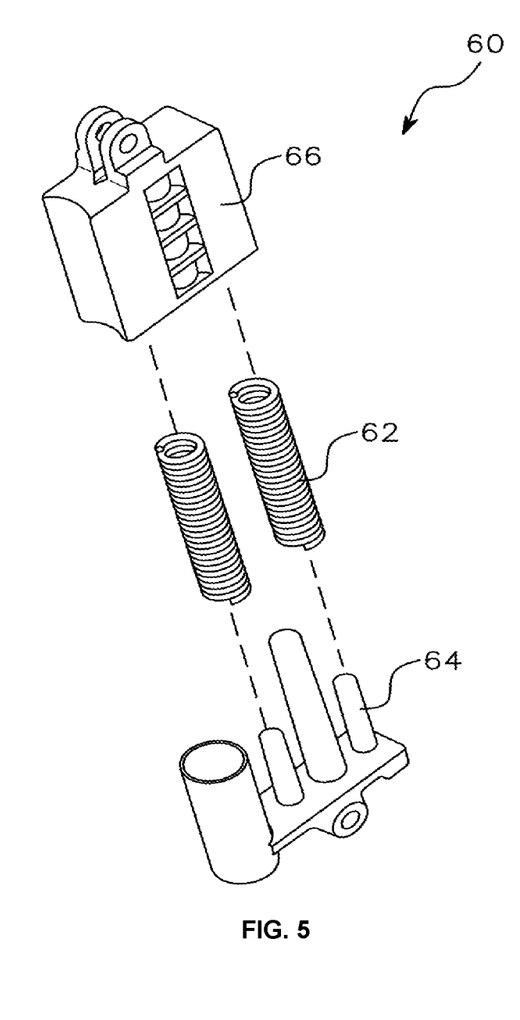
FIG. 5 is an exploded view showing an elastic member of the multi-link hinge according to the present disclosure.

To achieve the above purpose, the elastic member 60 includes a main spring 62, a spring guide 64 inserted in the main spring 62, a spring cover 66 coupled to the spring guide 64, as shown in FIG. 5.

The main spring 62 may be inserted over the spring guide 64 and be covered with the spring cover 66. Therefore, the main spring 62 may be precisely guided and durability thereof may be improved.

Hereinbelow, an operation process of the multi-link hinge of the present disclosure as described above will be stepwisely described in detail with reference to FIGS. 2 to 4.

FIGS. 2 to 4 stepwisely show a door opening process, and in the other hand, FIGS. 4 to 2 stepwisely show a door closing process.

According to the preferred embodiment of the present disclosure, the door is opened or closed in response to a rotating direction of the cam 10 on the shaft 12. When the cam 10 is rotated clockwise, the door is opened, and when the cam 10 is rotated counterclockwise, the door is closed.

FIG. 2 is a view showing a closed state of the door. As shown in the drawings, a force transmitting direction (an arrow direction in FIG. 2) by the elastic member 60 is in a slight right direction from a central direction (a solid line direction in FIG. 2) of the shaft 12. Then, the force is transmitted so as to rotate the cam 10 counterclockwise on the shaft 12, so that the door may maintain the closed state.

When the door opening begins, as shown in FIG. 3, the cam 10 is rotated clockwise at a predetermined angle by the outer link 30, and the force transmitting direction (arrow direction in FIG. 3) by the elastic member 60 is directed in a left direction based on the center direction (closed line in FIG. 3) of the shaft 12. Then, the cam 10 is rotated clockwise on the shaft 12.

When the cam 10 is rotated clockwise, the connection link 50 transmits the force rotating the inner link 40 in the direction opposite to the rotating direction of the cam 10 on the first side portion of the inner link 40.

The cam 10 is rotated clockwise on the shaft 12 and the inner link 40 is rotated counterclockwise on the first side portion of the inner link 40.

Therefore, the arm link 20 is raised upward at a predetermined height by the inner link 40 in which the second side portion thereof is raised at a predetermined height in addition to the inner link is rotated on the first side portion thereof, and the outer link 30 coupled to the cam 10 rotated counterclockwise, whereby the door is opened.

Figure 6:
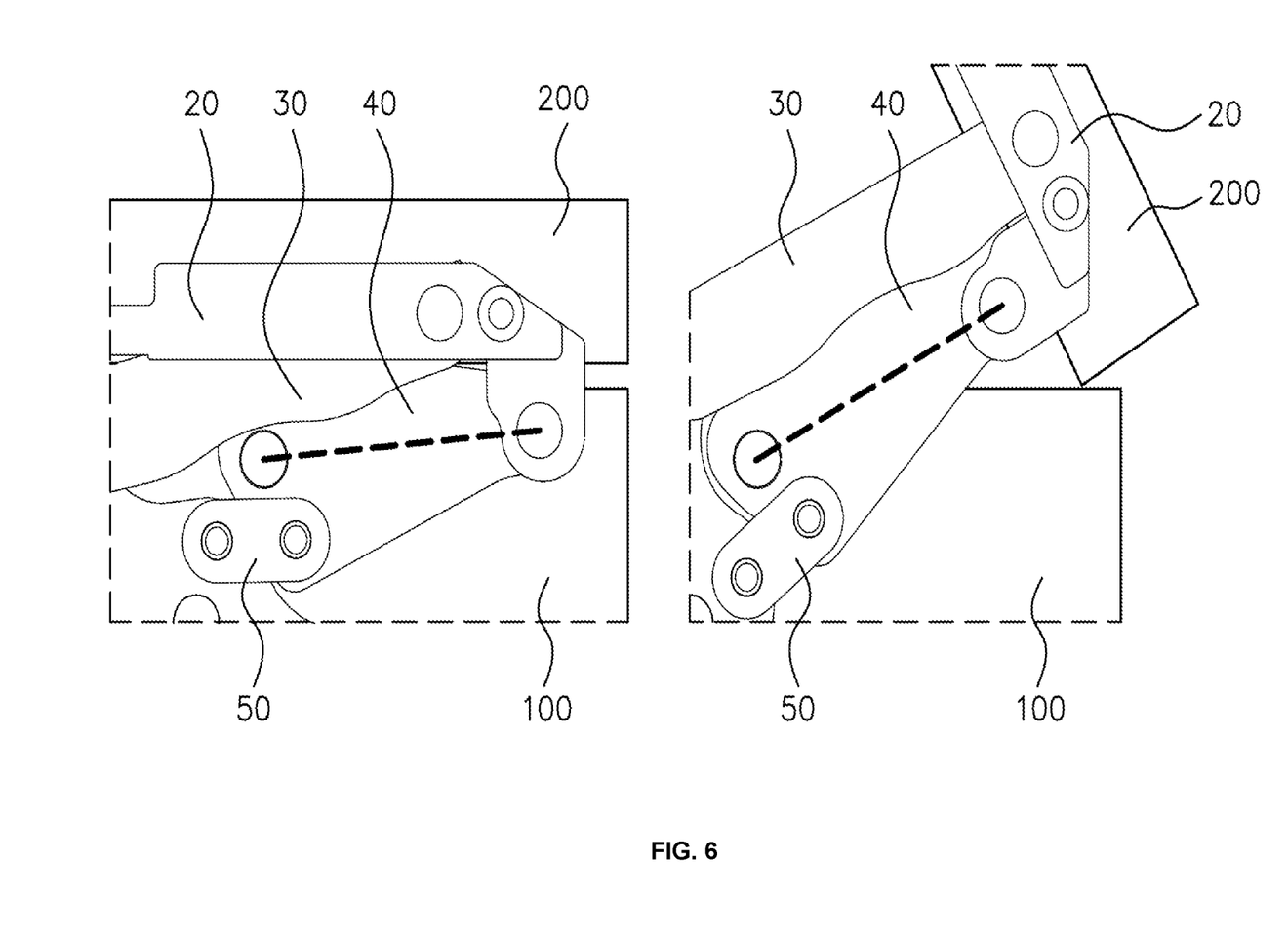
FIG. 6 is a partially enlarged view showing the closed and open states of the door of the apparatus to which the multi-link hinge according to the present disclosure is applied.

FIG. 6 is a view showing the closed and open states of the door of the apparatus to which the multi-link hinge is applied, and the closed and open states of the door will be described in detail as follows.

As shown in the drawing, when the door is turned from the closed state to the open state, the arm link 20 is raised upward and is rotated clockwise by the inner link 40 that is rotated on the first side portion thereof by the connection link 50 and is raised, at the second side portion, to the predetermined height by the outer link 30 coupled to the cam.

As a result, even when a gap between the door 200 and the main body 100 is minimized, in opening of the door, interference between an edge portion of the door 200 and the main body 100 may not be caused.

Hereinbelow, the closing process of the door will be stepwisely described with reference to FIGS. 2 to 4.

When a user pushes and closes the door in a full-open state as shown in FIG. 4, the cam 10 is rotated counterclockwise on the shaft 12 by the outer link 30 and the inner link 40 connected to the arm link 20, and by the connection link 50.

When the door is in the closed state as shown in FIG. 2 by passing thorough the state in FIG. 3, the force transmitting direction (arrow direction in FIG. 2) by the elastic member 60 is in a right direction based on the central direction (closed line in FIG. 2) of the shaft 12. Then, the force is transmitted so as to rotate the cam 10 counterclockwise on the shaft 12, so that the door may maintain the closed state.

According to the preferred embodiment of the present disclosure as described above, the gap between the door and the main body may be minimized and the maximum opening angle of the door may be sufficiently secured. Therefore, inflow of various foreign substances into the apparatus may be minimized, and the door having the multi-link hinge may have excellent design to improve the product completion.

Hereinbelow, a multi-link hinge according to a preferred second embodiment of the present disclosure will be described.

In a case of an apparatus equipped with a tray for loading items inside a main body of the apparatus, the multi-link hinge may have a tray driving part 70 allowing the tray to slide into and out of the main body in conjunction with the motion of the door.

The tray driving part 70 includes a connector 72, a cam link 74, and a tray spring 76.

According to the present disclosure, a cam profile is formed on an outer circumferential surface of the cam 10. A tray driving cam profile, which specifies a portion between a portion coupled to the outer link 30 and a portion coupled to the elastic member 60 (in detail, a portion touching the tray driving part), may include a concave portion 14 and a convex portion 16.

The concave portion 14 is defined as a shape formed from the portion connecting the cam 10 to the outer link 30 and inclined downward and upward counterclockwise along the circumferential surface of the cam 10. In addition, the convex portion 16 is defined as a shape inclined upward and then downward.

The convex portion 16 may include a recessed portion 18 to detect a full-open state of the door.

The connector 72 has a first side portion rotatably coupled to the main body and a second side portion coupled to the tray (reference numeral 300 in FIGS. 3 and 4). The connector 72 allows the tray to slide into and out of the main body while performing a pendulum motion with the first side portion thereof as a shaft.

The cam link 74 has a first side portion coupled to the connector 72 and a second side portion rollably connected to the tray driving cam profile. Preferably, the cam link 74 may have a roller shape.

The tray spring 76 has a first side portion coupled to the connector 72 and a second side portion coupled to the main body so as to provide a restoring force pulling the connector 72 toward the cam 10. As a result, the tray that has been projected to the outside of the main body may be restored into the main body again.

Referring to FIGS. 2 to 4, first, in FIG. 2, a second end portion of the cam link 74 is located around the lowest portion of the concave portion 14 of the cam 10, so that the tray may be completely stored in the main body by the restoring force of the tray spring 76.

When the door is opened as shown in FIG. 3, the cam 10 is rotated clockwise, and the second end of the cam link 74 is rollably moved while passing through the concave portion 14 of the tray driving cam profile toward the convex portion 16, thereby moving the cam link 74 backward by a rotating radius increasing on the shaft 12.

The connector 72 coupled to the cam link 74 is also rotated on the first side portion thereof while overcoming the restoring force of the tray spring 76. Therefore, the tray 300 is exposed to the outside of the main body while sliding from the main body.

As shown in FIG. 4, when the door is in the full-open state, the second end of the cam link 74 is located at a portion near the highest portion of the convex portion 16 of the tray driving cam profile. As a result, the tray 300 may be fully exposed to the outside of the main body.

When the door is opened, the tray 300 is projected to the outside of the main body by the increasing amount of the rotation radius of the cam 10 between a portion at the lowest portion of the concave portion 14 of the cam 10 and a portion at the highest portion of the convex portion 16, and then, when the door is closed, the tray 300 is restored to an initial location thereof by the restoring force of the tray spring 76.

According to the preferred second embodiment of the present disclosure as described above, the tray sliding into and from the main body is operated in conjunction with the motion of the door, whereby various effects such as promotion of user convenience and product quality enhancement can be expected.

Hereinbelow, a preferred third embodiment of the present disclosure will be described.

The elastic member 60 according to the present disclosure may include a damper 80 at one side thereof in order to realize a shock absorbing function when the door is closed. Moreover, the convex portion 16 of the tray driving cam profile may include the recessed portion 18 in order for the user to detect the full-open state of the door.

When the door in the open state as shown in FIG. 4 is gradually closed, the cam 10 is rotated counterclockwise. Then, when the door is in the state in FIG. 3, the damper 80 is brought into contact with the convex portion 16 of the tray driving cam profile to prevent sudden closing of the door.

For achieving the above purpose, the damper 80 may have any shape that is capable of realizing the shock absorbing function. According to the present disclosure, it is structurally preferable that the damper 80 is provided at one side of the elastic member 60 and integrally formed with the elastic member 60.

When the door in the closed state is turned to the full-open state as shown in FIG. 4, the tray 300 operated in conjunction with the door is fully projected to the outside of the main body. Then, when the second side portion of the cam link 74 is seated on the recessed portion 18 provided in the convex portion 16 of the tray driving cam profile, the user can detect that the door is in the full-open state.

According to the preferred third embodiment of the present disclosure as described above, the multi-link hinge may realize the shock absorbing function when the door is closed, and the user can detect the door full-open state, so that the user convenience may be promoted when the user opens and closes the door.

Although the preferred embodiments of the present disclosure have been disclosed for illustrative purposes, those skilled in the art will appreciate that various modifications, additions and substitutions are possible, without departing from the scope and spirit of the present disclosure. As described above, the embodiments and the accompanying drawings disclosed in the present disclosure are provided for describing the present disclosure and are not intended to limit the technical ideas of the present disclosure. The technical ideas of the present disclosure are not limited to the embodiments and the drawings.

The protected scope of the present disclosure should be interpreted as the accompanying claims. All technical ideas within an equivalent the scope of the present disclosure should be interpreted as being included in the scope of a right of the present disclosure.

What is claimed is:

1. A multi-link hinge for facilitating opening and closing of a door with respect to a main body of an apparatus, the multi-link hinge comprising:
    a cam rotatably coupled to the main body of the apparatus with a cam pivot shaft affixed to the main body;
    an arm link rotatably coupled to the door;
    an outer link having a first side portion rotatably coupled to the cam and a second side portion rotatably coupled to the arm link;
    an inner link disposed at a lower portion of the outer link and having a first side portion rotatably coupled to the main body and a second side portion rotatably coupled to the arm link;
    a connection link having a first side portion rotatably coupled to the cam and a second side portion rotatably coupled to the inner link to transmit a force rotating the inner link in a direction opposite to a rotating direction of the cam; and
    an elastic member provided at a lower portion of the cam, and having a first side portion rotatably coupled to the main body with an elastic member pivot shaft affixed to the main body and a second side portion rotatably coupled to the cam with an elastic member connection shaft affixed to cam, wherein the elastic member is configured to provide an elastic pushing force between the elastic member pivot shaft and the elastic member connection shaft and toward the cam so as to bias the cam clockwise in response to a door opening motion and to bias the cam counterclockwise in response to a door closing motion,
    wherein, in a closed state of the door, a force transmitting direction of the elastic pushing force of the elastic member is in a slight right direction from a straight line between a center the elastic member pivot shaft and a center of the elastic member connection shaft to facilitate maintaining the door to be in closed state, and the force transmitting direction of the elastic pushing force is gradually moved to a leftward direction as the door is progressively opened by the door opening motion by operation of the cam and the elastic member, and vice versa, as the door is progressively closed by the door closing motion.

2. The multi-link hinge of claim 1, further comprising:
    a tray driving part configured to operate a tray to slide into and out of the main body in conjunction with the door motions,
    wherein a cam profile is formed on an outer circumferential surface of the cam,
    wherein the cam profile includes a try driving cam profile, which is defined at the cam profile between a portion of the cam coupled to the outer link and a portion of the cam coupled to the elastic member, the tray driving cam profile including a concave portion and a convex portion.

3. The multi-link hinge of claim 2, wherein the tray driving part comprises:
    a connector having a first side portion rotatably coupled to the main body and a second side portion coupled to the tray;
    a cam link having a first side portion coupled to the connector and a second side portion connected to the cam to be rollably moved along the tray driving cam profile; and
    a tray spring having a first side portion coupled to the connector and a second side portion coupled to the main body, and configured to provide a force pulling the connector toward the cam.

4. The multi-link hinge of claim 3, wherein the convex portion of the tray driving cam profile includes a recessed portion, and the second side portion of the cam link in a rollably moved state is seated on the recessed portion to detect that the door is in a full open state.

5. The multi-link hinge of claim 2, further comprising: a damper provided at one side of the elastic member, wherein the damper is configured to be brought into contact with the convex portion of the tray driving cam profile when the cam is rotated counterclockwise due to the door closing motion so that the damper prevents the door from being suddenly closed.

6. The multi-link hinge of claim 1, wherein the elastic member comprises a main spring, a spring guide inserted in the main spring, and a spring cover coupled to the spring guide.

* * * * *